(12) United States Patent
Bonnier et al.

(10) Patent No.: US 10,217,439 B2
(45) Date of Patent: Feb. 26, 2019

(54) ELECTRONIC DEVICE WITH AMBIENT LIGHT SENSOR SYSTEM

(71) Applicant: Apple Inc., Cupertino, CA (US)

(72) Inventors: Nicolas P. Bonnier, Campbell, CA (US); Cheng Chen, San Jose, CA (US); Jiaying Wu, San Jose, CA (US); Wei Chen, Palo Alto, CA (US); Paul V. Johnson, San Francisco, CA (US); John Z. Zhong, Saratoga, CA (US)

(73) Assignee: Apple Inc., Cupertino ( * ) Notice: Subject to any disclaimer, the term of this patent is extended or adjusted under 35 U.S.C. 154(b) by 4 days.

(21) Appl. No.: 15/238,522

(22) Filed: Aug. 16, 2016

(65) Prior Publication Data

US 2017/0229059 A1 Aug. 10, 2017

Related U.S. Application Data

(60) Provisional application No. 62/291,375, filed on Feb. 4, 2016.

(51) Int. Cl.
| | | |
|---|---|---|
| *G09G 5/10* | (2006.01) | |
| *G06F 3/044* | (2006.01) | |
| *G06F 3/041* | (2006.01) | |
| *G09G 3/20* | (2006.01) | |
| *G09G 5/02* | (2006.01) | |

(52) U.S. Cl.
CPC .............. *G09G 5/10* (2013.01); *G06F 3/044* (2013.01); *G06F 3/0414* (2013.01); *G09G 3/20* (2013.01); *G09G 5/02* (2013.01); *G09G 2320/0626* (2013.01); *G09G 2320/0666* (2013.01); *G09G 2360/144* (2013.01)

(58) Field of Classification Search
CPC ..... G09G 2360/144; G09G 2320/0626; G09G 2320/0666; G09G 3/3406; H04N 5/58
USPC ................................................... 345/102, 690
See application file for complete search history.

(56) References Cited

U.S. PATENT DOCUMENTS

| | | | |
|---|---|---|---|
| 9,449,561 B1 * | 9/2016 | Umansky | G09G 5/003 |
| 2008/0303918 A1 | 12/2008 | Keithley | |
| 2012/0050307 A1 * | 3/2012 | Mahowald | H05B 37/0218 345/590 |
| 2012/0092541 A1 | 4/2012 | Tuulos et al. | |
| 2012/0229380 A1 * | 9/2012 | Silvester | G06F 1/1626 345/158 |

(Continued)

*Primary Examiner* — Koosha Sharifi-Tafreshi
(74) *Attorney, Agent, or Firm* — Treyz Law Group, P.C.; G. Victor Treyz; Vineet Dixit

(57) ABSTRACT

An electronic device may be provided with a display mounted in a housing. Color ambient light sensors may make measurements of ambient light intensity and color through windows in an inactive border region of the display or other portions of the device. The electronic device may process the ambient light measurements based on ambient light information from the ambient light sensors and based on information from additional sensors such as an image sensor, a force sensor, a capacitive touch sensor, a proximity sensor, an orientation sensor, and other devices. Control circuitry in the electronic device may produce reliable ambient light measurements by combining readings from multiple reliable sources and by discarding readings from ambient light sensors that are blocked by a user's fingers or other external objects. Display color cast and intensity may be adjusted based on ambient light information.

20 Claims, 9 Drawing Sheets

(56) References Cited

U.S. PATENT DOCUMENTS

| | | | |
|---|---|---|---|
| 2013/0076712 A1* | 3/2013 | Zheng | G01J 1/32 345/207 |
| 2014/0104253 A1* | 4/2014 | Koyanagi | G09G 5/02 345/207 |
| 2015/0070337 A1* | 3/2015 | Bell | G09G 3/2003 345/207 |
| 2015/0070402 A1* | 3/2015 | Shah | G09G 3/2003 345/690 |
| 2015/0092186 A1 | 4/2015 | Wieser et al. | |
| 2015/0109455 A1 | 4/2015 | Pang | |
| 2015/0269907 A1* | 9/2015 | Hadas | G09G 5/363 345/589 |
| 2016/0005362 A1* | 1/2016 | Chen | G09G 3/3406 345/690 |
| 2016/0366402 A1* | 12/2016 | Myers | H04N 17/004 |

* cited by examiner

ELECTRONIC DEVICE WITH AMBIENT LIGHT SENSOR SYSTEM

This application claims the benefit of provisional patent application No. 62/291,375, filed Feb. 4, 2016, which is hereby incorporated by reference herein in its entirety.

BACKGROUND

This relates generally to electronic devices, and, more particularly, to light sensors for electronic devices.

Electronic devices such as laptop computers, cellular telephones, and other equipment are sometimes provided with light sensors. For example, ambient light sensors may be incorporated into a device to provide the device with information on current lighting conditions. Ambient light readings may be used in controlling the device. If, for example bright daylight conditions are detected, an electronic device may increase display brightness to compensate.

Ambient light sensors can sometimes produce erroneous readings. For example, a user's finger or other external object may block an ambient light sensor. In this type of situation, the ambient light sensor may produce a reading that does not accurately reflect ambient lighting conditions. If care is not taken, this may lead to inappropriate display adjustments.

It would therefore be desirable to be able to provide improved systems for sensing ambient light in electronic devices.

SUMMARY

An electronic device may be provided with a display. Color ambient light sensors may make measurements of ambient light intensity and color through windows in an inactive border region of the display. An image sensor may be located under a display window that is located between the windows associated with the color ambient light sensors. Additional sensors may also be used.

The electronic device may process ambient light measurements to produce reliable ambient light information. Ambient light measurements may be processed based on ambient light information from the ambient light sensors and based on information from additional sensors. Historical ambient light sensor data and predetermined performance criteria can also be used in processing ambient light sensor measurements. The additional sensors that are used in supplying this information may include the image sensor located under the display window and/or other image sensors, force sensors, capacitive touch sensors, proximity sensors, orientation sensors, and/or other input-output devices.

Control circuitry in the electronic device may produce ambient light measurement by combining readings from multiple reliable sources and by discarding readings from ambient light sensors that are blocked by a user's fingers or other external objects. Display color cast and intensity may be adjusted based on ambient light information.

DETAILED DESCRIPTION

Figure 1:
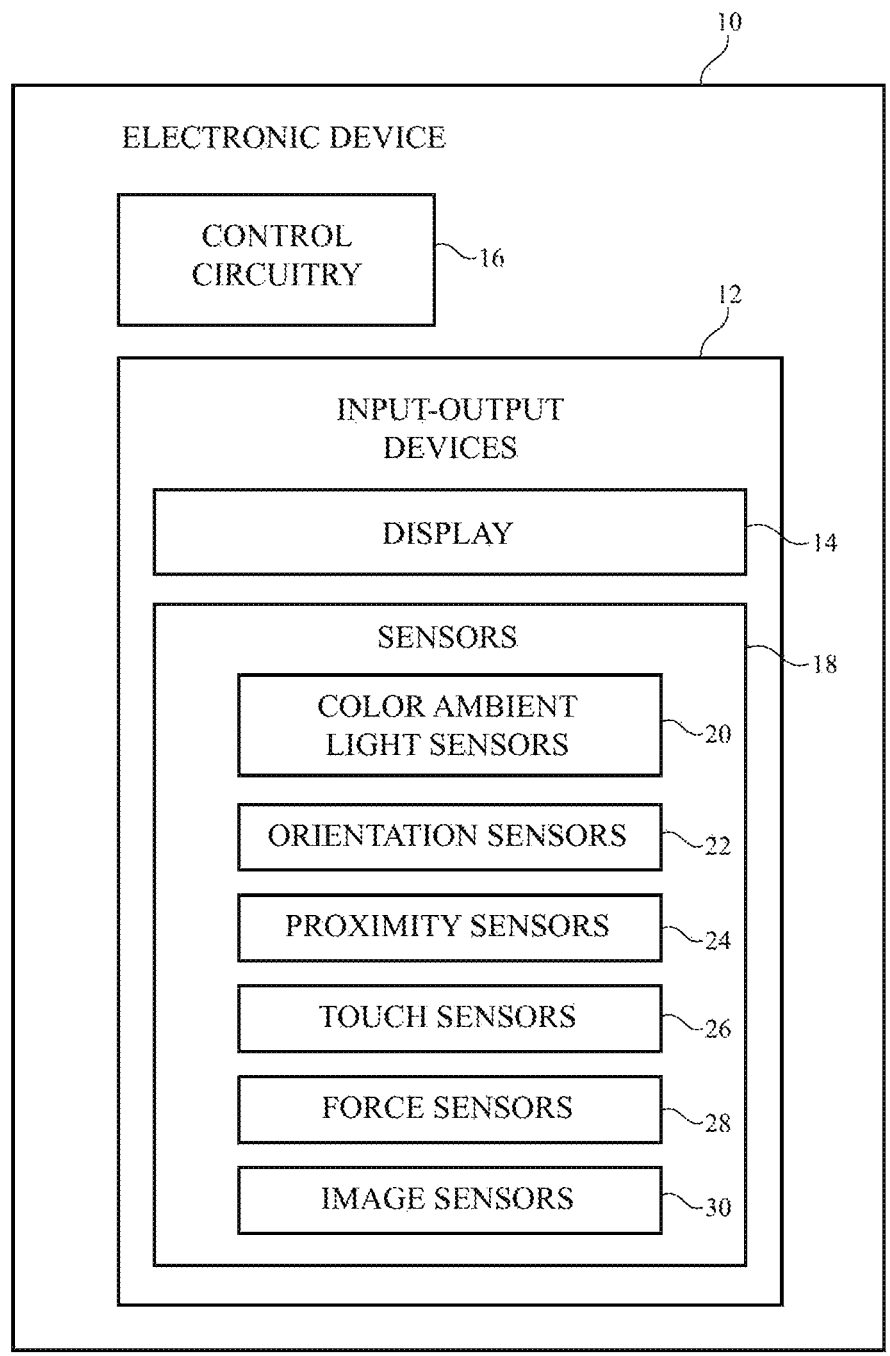
FIG. 1 is a schematic diagram of an illustrative electronic device in accordance with an embodiment.

An illustrative electronic device of the type that may be provided with one or more light sensors is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a navigation device, an embedded system such as a system in which electronic equipment with a display is mounted in a kiosk or automobile, equipment that implements the functionality of two or more of these devices, or other electronic equipment.

As shown in FIG. 1, electronic device 10 may have control circuitry 16. Control circuitry 16 may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, key pads, keyboards, microphones, speakers, tone generators, vibrators, cameras, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements.

Input-output devices 12 may also include sensors 18. Sensors 18 may include ambient light sensors such as color ambient light sensors 20, orientations sensors 22 (e.g., accelerometers, compasses, motion sensors, gyroscopes, etc.), proximity sensors 24, touch sensors 26, force sensors 28, and image sensors 30.

Ambient light sensors 20 may be used to make ambient light intensity (brightness) measurements. Ambient light intensity measurements, which may sometimes be referred to as ambient light luminance measurements, may be used by device 10 to adjust display brightness (as an example). Ambient light sensors 20 may be used to make measurements of ambient light color (e.g., color coordinates, correlated color temperature, or other color parameters representing ambient light color). Ambient light color information may be used to adjust display color. For example, ambient light color information may be used by control circuitry 16 to change the color cast of display 14 in response to a change in the color environment of device 10 from warm indoor lighting to cool outdoor lighting conditions. Ambient light sensor information can also be used in taking other suitable actions such as adjusting shading, texture, or other on-screen effects for objects on display 14, can be used in otherwise controlling the rendering of electronic content on display 14 (e.g., adjusting the way in which electronic content such as text, graphics, animation, video, images, and other content is displayed), or can be used in controlling other device functions during the operation of device 10. Illustrative arrangements in which display characteristics such as display brightness and display color (color cast) are changed in response to ambient light sensor information are sometimes be described herein as an example.

One or more orientation sensors such as orientation sensors 22 may be used in monitoring the orientation of device 10 relative to the Earth. Information from an orientation sensor in device 10 may be used to help determine the way in which a user of device 10 is holding device 10 and may therefore be used to help assess whether a user's fingers are blocking sensors such as ambient light sensors 20.

Proximity sensors 24 may include one or more light-based proximity sensors. A light-based proximity sensor may include a light source such as an infrared light-emitting diode and may include a light detector such as a photodetector that is sensitive to infrared light. This type of proximity sensor may produce a low output when no external objects are in the vicinity of the detector. When a user's finger or other external object is in the vicinity of the proximity sensor, emitted light from the proximity sensor may be reflected into the light detector from the external object and measured, producing a high output. Device 10 can evaluate the size of the output signal from the light detector of the proximity sensor to determine whether or not an external object such as the finger of a user is in the vicinity of the proximity sensor and device 10.

Touch sensors 26 may be provided as part of display 14, as part of a track pad, or as stand-alone components. Touch sensors 26 may be based on capacitive touch sensor technology or other touch sensor technology (acoustic touch, light-based touch, force-based touch, etc.). In an illustrative scenario, touch sensors 26 include capacitive touch sensors. A capacitive touch sensor has capacitive touch sensor electrodes. When a user's finger or other external object contacts the touch sensor electrodes, changes in capacitance can be measured (i.e., a touch event can be confirmed).

Force sensors 28 may include capacitive force sensors that measure force by detecting changes in capacitance as force sensor electrodes are deflected, may include resistive force sensor structures that change resistance in response to applied force, may include strain gauges, may include piezoelectric materials, or may contain other materials and structures that measure applied force. Force sensors 28 may be used to determine when a user's finger or other external objects are pressing against portions of device 10.

Image sensors 30 may be semiconductor integrated circuits that contain arrays of image sensor pixels for capturing digital images. Focusing lenses may be used to focus images on image sensors 30 (i.e., sensors 30 may serve as cameras in device 10). With one illustrative arrangement, image sensors 30 include a front image sensor (front camera) that faces outwardly from a front face of device 10 and include a rear image sensor (rear camera) that faces outwardly from a rear face of device 10. There may be one image sensor, two image sensor, three image sensors, or any other suitable number of image sensors in device 10. The image sensors may be used to capture full digital images of a scene and may, if desired, be used to capture ambient light data (e.g., by using a subset of the image sensor pixels in each image sensor, by processing some or all of the image pixel data in a full frame of captured image data, and/or by using ambient light detector devices that are integrated onto a common die with an array of image sensor pixels). Data from image sensors 30 that is indicative of ambient lighting conditions around device 10 and that does not represent an image of a scene may sometimes be referred to as image sensor ambient light reading data.

If desired, sensors 18 may include other sensors such as a magnetic sensor, a temperature sensor, a pressure sensor, a microphone or other sound sensor, or other sensors. Output data from these sensors may be processed by control circuitry 16 in conjunction with information from sensors 20, 22, 24, 26, 28, and 30.

Figure 2:
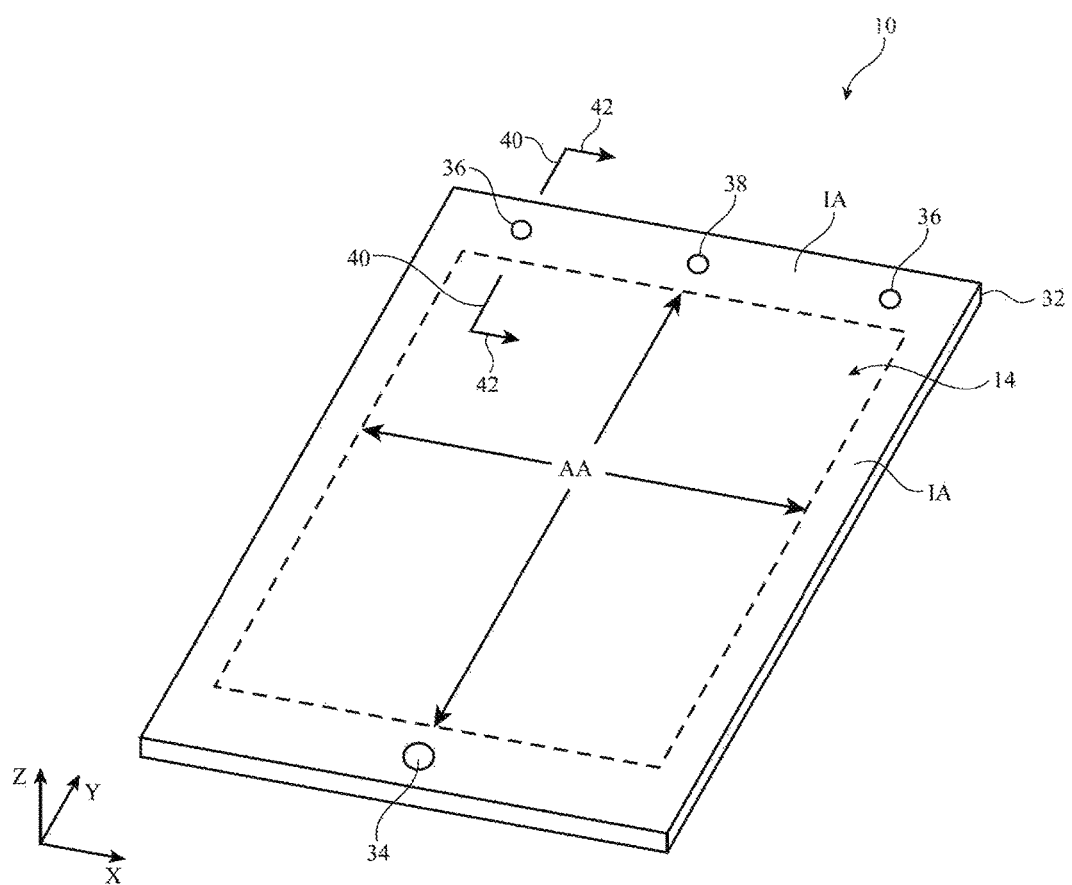
FIG. 2 is a front perspective view of a portion of an illustrative electronic device in accordance with an embodiment.
Figure 3:
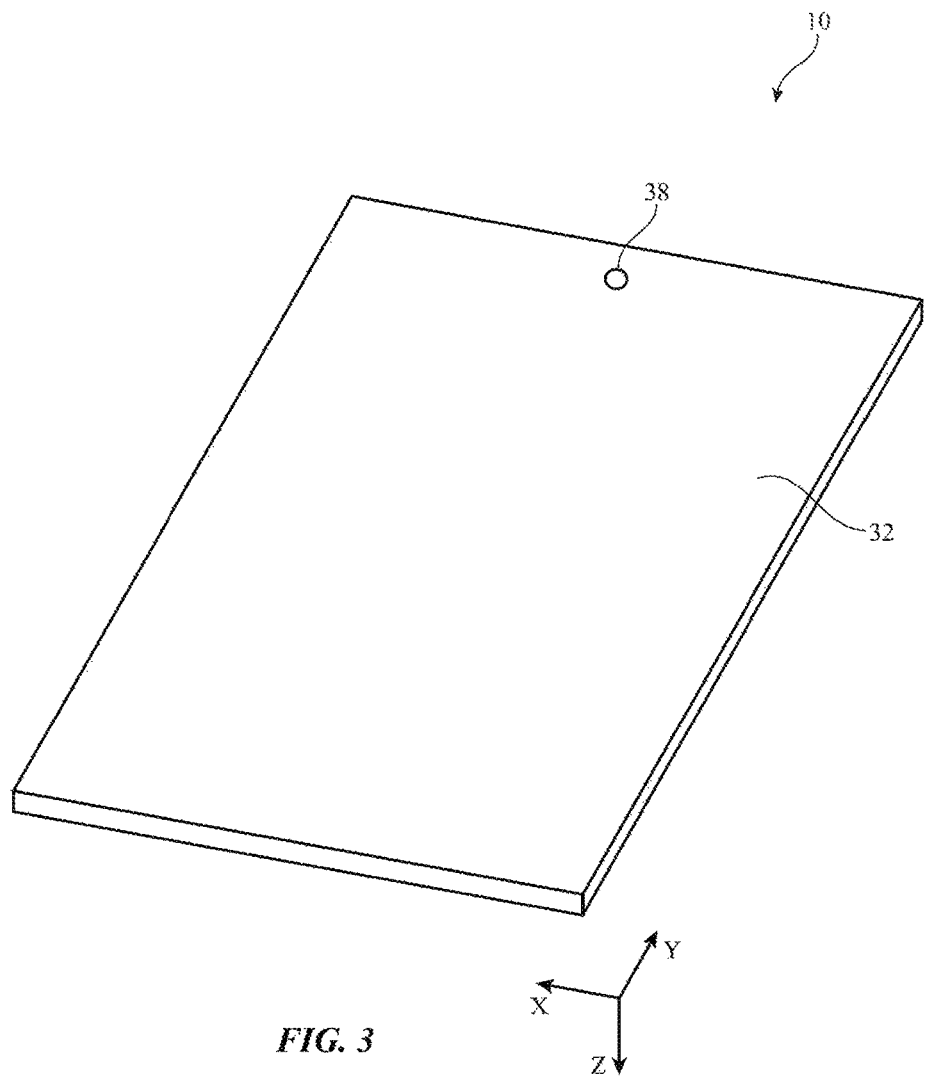
FIG. 3 is a rear perspective view of the illustrative electronic device of FIG. 2 in accordance with an embodiment.

A perspective view of a portion of an illustrative electronic device is shown in FIG. 2. In the example of FIG. 2, device 10 includes a display such as display 14 mounted in housing 32. Housing 32, which may sometimes be referred to as an enclosure or case, may be formed of plastic, glass, ceramics, fiber composites, metal (e.g., stainless steel, aluminum, etc.), other suitable materials, or a combination of any two or more of these materials. Housing 32 may be formed using a unibody configuration in which some or all of housing 32 is machined or molded as a single structure or may be formed using multiple structures (e.g., an internal frame structure, one or more structures that form exterior housing surfaces, etc.).

Display 14 may be protected using a display cover layer such as a layer of transparent glass, clear plastic, sapphire, or other clear layer. Openings may be formed in the display cover layer. For example, an opening may be formed in the display cover layer to accommodate a button such as button 34, an opening may be formed for a speaker port, and openings may be formed for other components. Openings may be formed in housing 32 to form communications ports (e.g., an audio jack port, a digital data port, etc.), to form openings for buttons, etc.

Display 14 may include an array of display pixels formed from liquid crystal display (LCD) components, an array of electrophoretic pixels, an array of plasma pixels, an array of organic light-emitting diode pixels or other light-emitting diodes, an array of electrowetting pixels, or pixels based on other display technologies. The array of pixels of display 14 forms an active area AA. Active area AA is used to display images for a user of device 10. Active area AA may be rectangular or may have other suitable shapes. Inactive border area IA may run along one or more edges of active area AA. Inactive border area IA may contain circuits, signal lines, and other structures that do not emit light for forming images.

To hide inactive circuitry and other components in border area IA from view by a user of device 10, the underside of the outermost layer of display 14 (e.g., the display cover layer or other display layer) and/or other layers of display 14 may be coated with an opaque masking material such as a layer of black ink. Optical components (e.g., a camera, a light-based proximity sensor, ambient light sensors, status indicator light-emitting diodes, camera flash light-emitting diodes, etc.) may be mounted under inactive border area IA. One or more light-transmitting regions (sometimes referred to as windows, light-transmitting windows, or optical component windows) may be formed in the opaque masking layer of IA to accommodate the optical components. The windows may be formed from openings in the opaque masking layer and may, if desired, include inks or other materials within the openings (e.g., an infrared-transparent and visible-light-blocking layer for a proximity sensor that operates using infrared light and other layers with desired spectral transmittance properties).

If desired, light-based components may also be mounted in other portions of device 10 (e.g., locations where light is received through openings in housing 32, portions of device 10 where light is received through transparent portions of display 14 in active area AA, etc.). In general, windows (light passageways) for optical components may be formed on the rear surface of housing 32, on the sidewalls of housing 32, on display cover layer of display 14 (e.g., in active area AA and/or inactive region IA), at the corners of inactive area IA, along the edges of device 10, or elsewhere in device 10. In the illustrative configuration of FIG. 2, device 10 includes color ambient light sensors 20 (FIG. 1) mounted within housing 32 in alignment with ambient light sensor windows 36 at the upper left and upper right corners of inactive area IA of display 14 and includes an image sensor 30 (FIG. 1) mounted within housing 32 in alignment with front camera window 38 between windows 36 in the middle of the portion of inactive area IA that runs along the upper edge of display 14 (i.e., the edge of display 14 opposing the edge at which button 34 is located). If desired, ambient light sensor windows may be located in the lower left and lower right corners of display 14 or elsewhere in device 10 and/or additional front-facing camera windows may be formed in device 10. The example of FIG. 2 is merely illustrative. As shown in the rear perspective view of device 10, device 10 may also have one or more rear-facing camera windows such as rear camera window 38 in a middle portion of the rear wall of housing 32 along the upper edge of housing 32.

Figure 4:
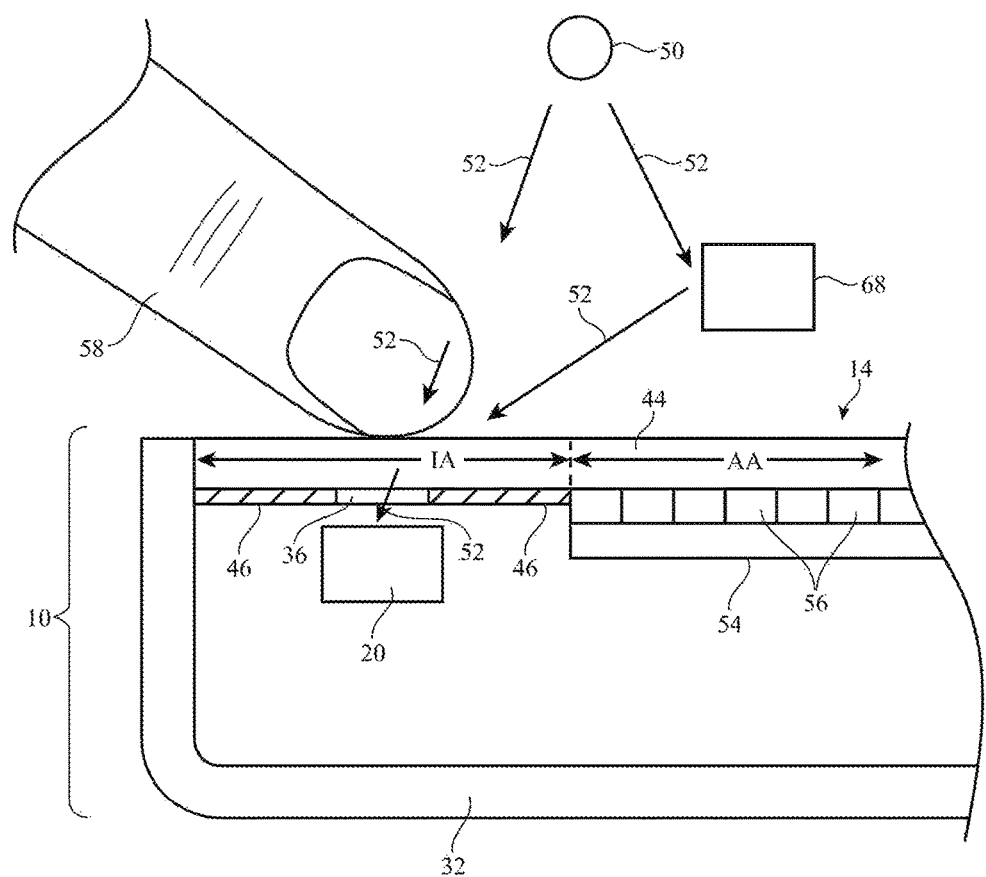
FIG. 4 is a cross-sectional side view of an illustrative light sensor mounted under a window in an inactive portion of a display in accordance with an embodiment.

A cross-sectional side view of a portion of device 10 taken along line 40 and viewed in direction 42 of FIG. 2 is shown in FIG. 4. As shown in FIG. 4, color ambient light sensor 20 may be mounted within housing 32 of device 10 (i.e., in the interior of device 10) in alignment with window 36. Window 36 may be formed in inactive area IA of display 14. Display 14 may have a transparent planar member such as display cover layer 44 (e.g., a layer of clear plastic, glass, sapphire, or other transparent material(s)). In active area AA, display 14 may include display layers 54 that form an array of pixels 56 for displaying images for a user. Display cover layer 44 may overlap the array of pixels 56 in active area AA.

To hide internal components in display 14 from view, the inner surface of display cover layer 44 in inactive area IA may have an opaque coating layer such as opaque masking layer 46. Window 36 may be formed within opaque masking layer 46. Window 36 may, for example, be formed from a circular or rectangular opening in layer 46 that is aligned with ambient light sensor 20. Camera window 38 of FIG. 2 may also be formed from an opening in opaque masking layer 46. If desired, ambient light sensor windows such as window 36 may include coatings that filter incoming light (e.g., coatings that block infrared light, that block ultraviolet light, that partially block visible light, etc.).

During operation of device 10, color ambient light sensor 20 may be used to make measurements on ambient lighting conditions in the vicinity of device 10. Control circuitry 16 of device 10 can use ambient light information to make adjustments to display 14 or to take other suitable actions. As shown in FIG. 4, ambient light may be generated by light sources such as light source 50. Light source 50 may be the sun, a lamp, a light-emitting diode light bulb, or other suitable source of lighting.

Light source 50 may produce light 52. In some situations, light 52 may pass directly to color ambient light sensor 20 through window 36. In other situations, light 52 may reflect off an external object in the vicinity of window 36 such as object 68 or may pass through a user's finger or other body part, as shown by finger 58 of FIG. 4. When light 52 reflects off of external objects or passes through finger 58, light 52 may obtain a color cast. For example, light 52 that passes through finger 58 may become reddish or light that reflects from a colored object may become unexpectedly warm or cold. The presence of external objects such as finger 58 may also block incoming light. If care is not taken to account for the influence of external objects such as object 68 and finger 58 in the path of ambient light 52, information on the intensity and color of light 52 that is gathered using color light sensor 20 may not accurately reflect the actual ambient lighting conditions of device 10.

If desired, data from multiple color ambient light sensors 20 and/or data from other sources (e.g., data from sensors 18 and other data associated with the operation of device 10) may be used to help determine whether ambient light measurements by color ambient light sensors 20 are reliable. In response to producing reliable color ambient light sensor data (i.e., reliable ambient light intensity data and ambient light color data), device 10 can take appropriate actions such as adjusting the brightness and color of display 14. In response to determining that color ambient light sensor information from color ambient light sensors 20 is not reliable, device 10 can gather new color ambient light sensor readings, access historical color ambient light sensor readings, and/or may gather and process additional sensor data to produce accurate color ambient light sensor data. For example, device 10 can make color ambient light sensor measurements with multiple color ambient light sensors 20 and can process these measurements to determine whether the gathered color ambient light sensor information is reliable. Device 10 can also use image sensor measurements, orientation sensor measurements, and other input to help determine whether or not gathered ambient light sensor readings are reliable and/or to process ambient light readings to produce reliable ambient light information for use by control circuitry 16.

Figure 5:
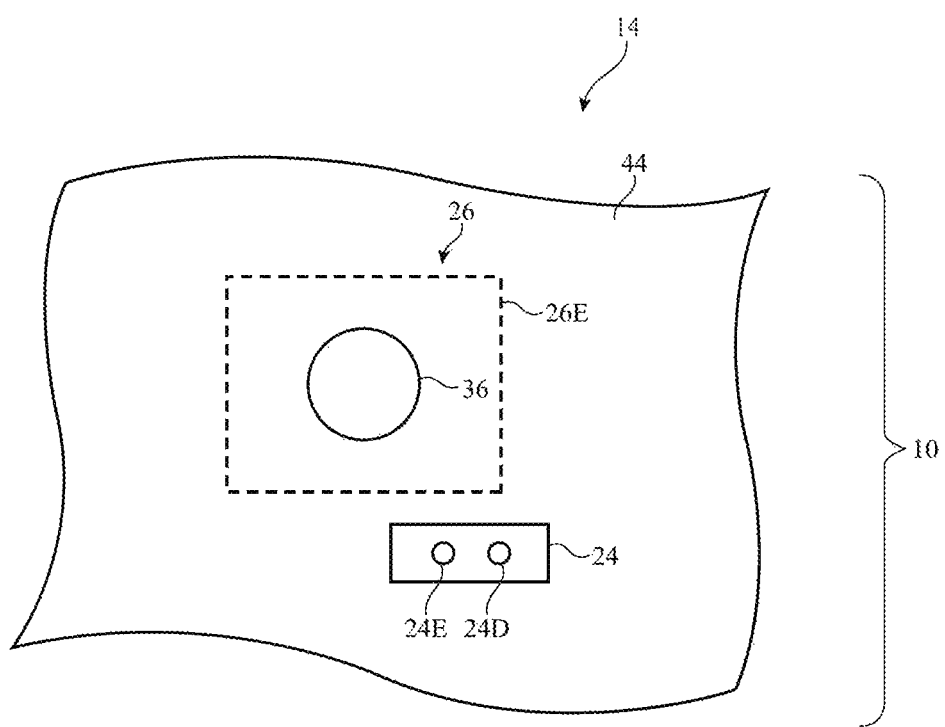
FIG. 5 is a top view of an illustrative ambient light sensor showing how an adjacent proximity sensor and overlapping touch sensor may be provided to monitor for objects in the vicinity of the ambient light sensor in accordance with an embodiment.

If desired, sensors may be used to measure when finger 58 or other external objects are in the vicinity of window 36 and may therefore be impairing the accuracy of color ambient light sensor 20. Consider, as an example, the top view of a portion of display cover layer 44 in the vicinity of window 36 in FIG. 5. In the example of FIG. 5, a capacitive touch sensor 26 has been incorporated into device 10 that has a capacitive touch sensor electrode 26E. Capacitive touch sensor electrode 26E may be formed from a transparent material such as indium tin oxide (e.g., a transparent material that allows light 52 to pass through window 36) and/or may be formed from an opaque material such as metal that surrounds window 36. When a user's finger blocks window 36, readings from capacitive touch sensor 26 will detect the presence of the user's finger and can alert control circuitry 16 that the readings being made by color ambient light sensor 20 under window 36 are not reliable. In addition to or instead of using a touch sensor such as capacitive touch sensor 26 of FIG. 5, device 10 may include components such as light-based proximity sensor 24. Proximity sensor 24 may have a light source such as infrared light-emitting diode 24E and a corresponding infrared light detector 24D. When infrared light that is emitted by light-emitting diode 24E is detected by light detector 24D, control circuitry 16 can conclude that a user's finger such as finger 58 or other external object with the potential to affect the intensity and/or color of light 52 that is being measured by color ambient light sensor 20 is present in the vicinity of window 36.

Each of color ambient light sensors 20 is located under a different window 36 and therefore may be affected differently by nearby objects (e.g., user finger 58, external light-reflecting object 68, etc.). For example, a user may hold device 10 in an orientation in which button 34 is on the upper edge of device 10 (sometimes referred to as an upside down orientation or menu button up orientation). In this orientation, the thumbs of the user may cover both sensors 20. Scenarios in which only a single one of sensors 20 or neither of sensors 20 is blocked are also possible. In some scenarios, it may be possible to determine whether the light readings from sensors 20 are reliable by processing data from sensors 20 in the absence of other sensor data. In other scenarios, it may be helpful to analyze data from additional sensors 18. The way in which sensor data from sensors 20 is processed may vary depending on the usage scenario for device 10.

Figure 6:
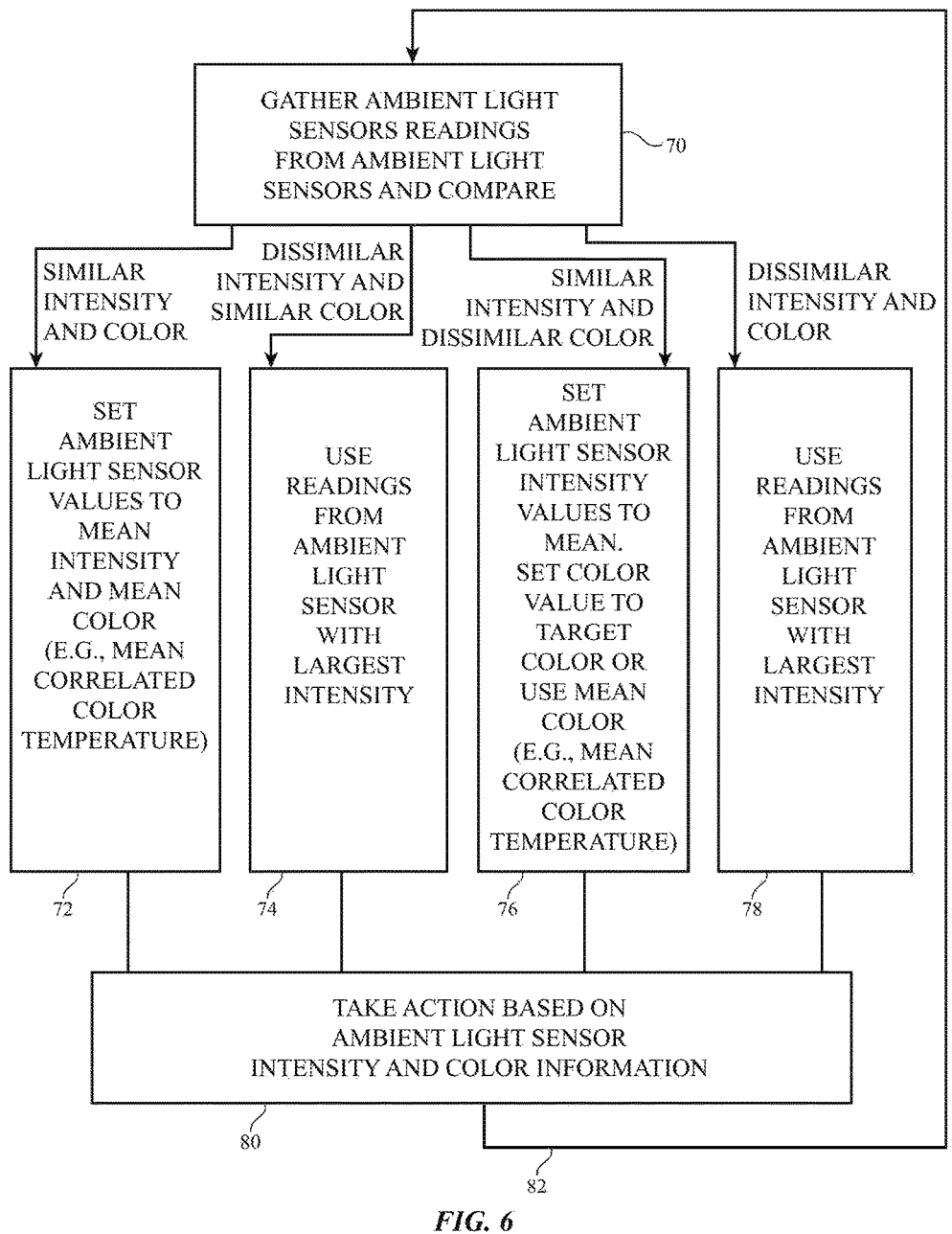
FIG. 6 is a flow chart of illustrative operations involved in processing ambient light sensor signals in accordance with an embodiment.

A flow chart of illustrative operations involved in gathering and using color ambient light sensor measurements during the operation of device 10 is shown in FIG. 6. In the illustrative example of FIG. 6, color ambient light sensor measurements are gathered from two color ambient light sensors 20 and are processed by control circuitry 16 based solely on the information available from sensors 20. In general, any suitable number of color ambient light sensors 20 may be used in gathering ambient light sensor information. The use of two ambient light sensors to gather information is sometimes described herein as an example.

At step 70, control circuitry 16 may use color ambient light sensors 20 to gather light intensity information on ambient light 52 and to gather light color information on ambient light 52. Color information (i.e., color ambient light sensor color data) may be gathered as color coordinates, correlated color temperature (CCT) readings, or using other suitable color sensing parameters. A first of sensors 20 may gather a first ambient light intensity reading and a first ambient light color reading. A second of sensors 20 may gather a second ambient light intensity reading and a second ambient color reading. During the operations of step 70, the intensity and color readings may be processed. For example, the intensity readings may be compared to each other and/or to predetermined intensity values (e.g., threshold values). Similarly, the color readings may be compared to each other and/or to predetermined color values. These comparisons may reveal whether the intensity measured with the first sensor is similar to the intensity measured with the second sensor and may reveal whether the color measured with the first sensor is similar to the color measured with the second sensor. Intensity and color measurements may be said to be similar to each other if they are within a predefined threshold amount of each other or satisfy other suitable similarity criteria and may otherwise be said to be dissimilar.

The processing operations of step 70 may be used to determine how to process the intensity and color readings from sensors 20 to produce accurate ambient light intensity and color information for use by control circuitry 16 in adjusting display brightness and color or taking other suitable action. If, as an example, it is determined during step 70 that the ambient light intensity readings and color readings from the first and second ambient light sensors 20 are similar to each other, control circuitry 16 may process the ambient light sensor data from the first and second sensors using the operations of step 72. At step 72, control circuitry 16 may, for example, compute the mean of the measured light intensities and the mean of the measured colors from the intensity and color data. The computed mean intensity may serve as the ambient light sensor intensity value that control circuitry 16 uses to control device 10 and the computed mean color (e.g., mean color coordinates, mean correlated color temperature, etc.) may serve as the ambient light sensor color value that control circuitry 16 uses to control device 10.

If, during the operations of step 70, it is determined that the measured light intensities from the first and second ambient light sensors are dissimilar and that the measured colors are similar, the sensor readings may be processed using the operations of step 74. During step 74, control circuitry 16 may discard the sensor readings from the ambient light sensor 20 with the smaller of the two measured light intensities and may retain the sensor readings (color and intensity) from the ambient light sensor 20 with the larger of the two measured light intensities.

If, during the operations of step 70, it is determined that the measured light intensities from the first and second ambient light sensors are similar and that the measured colors are dissimilar, the sensor readings may be processed using the operations of step 76. During step 76, control circuitry 16 may compute the mean of the measured light intensities from the first and second ambient light sensors. Control circuitry 16 may also identify a predetermined default ambient light color (e.g., a predetermined target correlated color temperature such as 6500 K, which may be associated with average daylight (D65) or a predetermined target set of color coordinates such as the D65 color coordinates). Control circuitry 16 may then select the predetermined color, may select the sensor color value that is closes to a predetermined target color value (e.g., D65), may compute a mean of the measured colors from the first and second ambient light sensors, may select a maximum or minimum of the color values, or may perform other processing operations to select an appropriate color value to use as the ambient light sensor color value that control circuitry 16 uses to control device 10. The ambient light sensor intensity may be set to a mean (or max, min, or other suitable function) of both sensor intensity readings.

If, during the operations of step 70, it is determined that the measured light intensities from the first and second ambient light sensors are dissimilar and that the measured colors are dissimilar, the sensor readings may be processed using the operations of step 78. During step 78, control circuitry 16 may discard the sensor readings from the ambient light sensor 20 with the smaller of the two measured light intensities and may retain the sensor readings (color and intensity) from the ambient light sensor 20 with the larger of the two measured light intensities.

During processing operations (e.g., comparison operations in step 70 and/or operations associated with steps 72, 74, 76, and/or 78), sensor history data and/or predetermined performance criteria may be used in determining how to select appropriate intensity and/or color values. For example, sensor history information may be used to determine whether recently acquired sensor data from a sensor is too noisy, is abnormally constant, is too high or too low, or is otherwise likely to be associated with a damaged sensor. If sensor damage criteria such as these are satisfied by comparison of the sensor data to predetermined criteria and/or historical data, it may be concluded that associated sensor values from a sensor are abnormal and not to be trusted. Control circuitry 16 can then discard the abnormal sensor values or the abnormal sensor values may be assigned low weighting factors. If the sensor appears to be permanently affected (e.g., by comparison of sensor data to historical data, predetermined performance criteria, or other damaged sensor criteria), sensor data can be permanently discarded (e.g., until the sensor can be repaired and the system reset).

At step 80, control circuitry 16 may take suitable actions based on the ambient light sensor intensity and color values that have been obtained by gathering and processing the ambient light sensor data from ambient light sensors 20. For example, if ambient light intensity is low, the brightness of display 14 may be lowered. If ambient light intensity is high, the brightness of display 14 may be raised. Ambient light color information may also be used to make display adjustments. For example, if ambient lighting conditions are warm, the color of display 14 may be adjusted to exhibit a corresponding warmer color cast. In response to detection of cold lighting conditions, the color cast of display 14 may be made correspondingly colder. Other actions may also be taken by control circuitry 16 in response to measured ambient light intensity and color (e.g., camera adjustments, camera flash adjustments, adjustments to the texturing and shadowing of objects on display 14, adjustments to the colors and intensities of text and graphical elements and/or background elements in displayed content, and/or other adjustments to the operation of device 10). If desired, the actions taken at step 80 may depend on the outcome of the sensor data processing operations of step 70. In situations in which sensor readings from different sensors are dissimilar such as when dissimilar intensity and similar color is detected (see, e.g., step 74), in which similar intensity and dissimilar color is detected (see, e.g., step 76), and in which dissimilar intensity and color is detected (see, e.g., step 78), the action taken during the operations of step 80 may be more conservative than in situations in which the sensor readings from different sensors are similar (see, e.g., step 72). As an example, when sensor readings are dissimilar, smaller display brightness settings changes may be made or display brightness changes may be made more slowly, color changes may be smaller or made more slowly, camera adjustments may be smaller or may be omitted, camera flash adjustments may be smaller or may be omitted, and less noticeable changes may be made to content on display 14 relative to the actions taken when sensor readings are similar. In general, reductions in the amount of change and/or rate of change made to settings associated with operating display 14 or any other suitable display operating parameters may be made in response to reductions in the amount of similarity between sensor readings. As illustrated by line 82, operations may loop back to step 70 after step 80 so that additional ambient light sensor data may be gathered.

Figure 7:
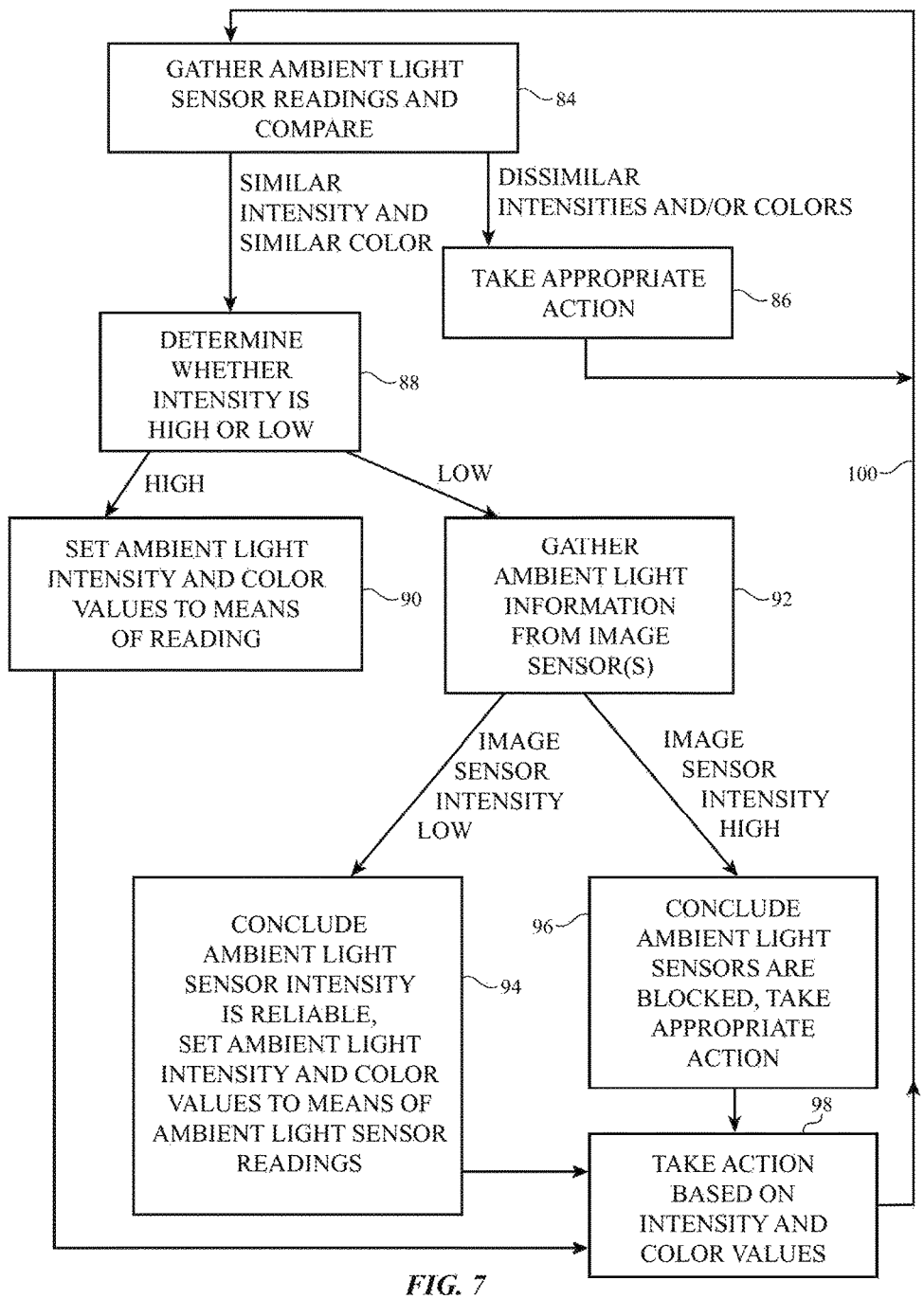
FIG. 7 is a flow chart of illustrative operations involved in using image sensor information in the processing of ambient light sensor signals in accordance with an embodiment.

If desired, measured ambient light intensity from ambient light sensors 20 may be used in determining how to process gathered ambient light sensor readings. Consider, as an example, the arrangement of FIG. 7. As with the arrangement of FIG. 6, sensors readings may be gathered and compared using ambient light sensors 20 (step 84). If the intensity and/or color readings of the first and second ambient light sensors differ, appropriate action may be taken at step 86 to determine appropriate ambient light intensity and color values for use by control circuitry 16, as described in connection with steps 74, 76, and 78 of FIG. 6.

In response to determining that both the intensity and color readings from first and second ambient light sensors 20 are similar, control circuitry 16 may, at step 88, determine whether the measured light intensity from the sensors is low (i.e., i.e., the mean of the measured intensities below a predetermined threshold) or is high (i.e., the mean of the measured intensities is above the predetermined threshold).

In response to determining that the measured ambient light intensity is high, control circuitry 16 may set the ambient light intensity value to the mean of the measured ambient light intensity of the first and second ambient light sensors 20 and may set the ambient light color value to the mean of the measured ambient light color of the first and second ambient light sensors 20 (step 90).

If the measured ambient light intensity is low, control circuitry 16 may gather data from one or more of image sensors 30 at step 92. For example, control circuitry 92 may gather information from one or more sensor pixels in an image sensor associated with a front-facing camera under image sensor window 38 in inactive area IA of display 14. The gathered image sensor data may be gathered from all of the pixels in image sensor 30, from a subset of the image sensor pixels in image sensor 30, and/or from non-image-pixel light detectors on the same semiconductor die that forms image sensor 30. The image sensor data may include ambient light intensity information and, if desired, ambient light color information. The ambient light intensity information gathered using the image sensor (e.g., from the front camera of device 10) may be compared to a predetermined intensity value to determine whether the intensity reading from the light sensor is high or low (above or below the predetermined intensity).

If the ambient light intensity reading from the image sensor is low like the ambient light intensity readings from the ambient light sensors, it is unlikely that the ambient light sensors are blocked by the user's fingers and is likely that device 10 is located in a dark environment. Accordingly, control circuitry 16 can conclude that the ambient light sensor data from ambient light sensors 20 is reliable and can compute the means of the ambient light sensor intensity and color readings to produce the ambient light sensor intensity and color values for control circuitry 16 to use in controlling the operation of device 10 (step 94).

If the ambient light intensity reading from image sensor 30 is high and therefore differs from the ambient light intensity readings from ambient light sensors 20, it is likely that the user's thumbs or other external objects are blocking ambient light sensors 20. Accordingly, control circuitry 16 can take appropriate remedial action at step 96. For example, control circuitry 16 can use a previous ambient light sensor reading from a stored ambient light sensor data history stored in memory in circuitry 16 in place of the most current (and erroneous) light sensor readings. As another example, control circuitry 16 can use the ambient light readings gathered by the image sensor in place of the ambient light readings gathered by ambient light sensors 20. As another example, control circuitry 16 can use a weighted average technique or other processing technique to produce satisfactory ambient light intensity and color values based on both ambient light sensor data from sensors 20 and ambient light data from image sensor 30. Image sensors 30 on the front and/or rear of device 10 may be used to supply intensity and color information to control circuitry 16. Sensors such as proximity sensor 24 and capacitive sensor 26 of FIG. 5 may also be used to determine when sensors 20 have been blocked and are not producing reliable data.

The behavior of control circuitry 16 in determining which values to use for the ambient light intensity and color information can vary over time. For example, control circuitry 16 may not initially trust ambient light sensor data from sensors 20 if the measured light intensity is low and potentially corresponds to a blocked sensor, but may treat the measured light intensity information as valid when sufficient time has passed.

After taking the remedial actions of step 96 or after producing reliable ambient light intensity and color values at steps 90 and 94, control circuitry 16 may take action based on the intensity and color values at step 98 (e.g., display intensity may be adjusted, display color cast may be adjusted, etc.). Processing may then loop back to step 84, as indicated by line 100.

In some arrangements, it may be desirable to use data from orientation sensor 22 to determine whether device 10 is being held in a right side up or upside down configuration. It is more likely that sensors 20 along the top edge of device 10 are being blocked by a user's fingers when device 10 is being used in an upside down fashion.

Unusually colored ambient light readings may be indicative of blocked ambient light sensors (e.g., because a user's finger may impart a color cast to a light reading when the user's finger obscures some or all of a light sensor window). Accordingly, it may be desirable to acquire ambient light data with an image sensor whenever abnormal color readings are detected with ambient light sensors 20. If measured color information deviates by more than a predetermined amount from the color of known light sources (e.g., if the ambient light sensor color measurement deviates by more than a threshold value from the color gamut associated with known light bulbs and other light sources), the ambient light color value for control circuitry 16 to use in controlling device 10 may be set to a predetermined (default) color value or additional color measurements may be made in an attempt to acquire reliable color and intensity information.

Figure 8:
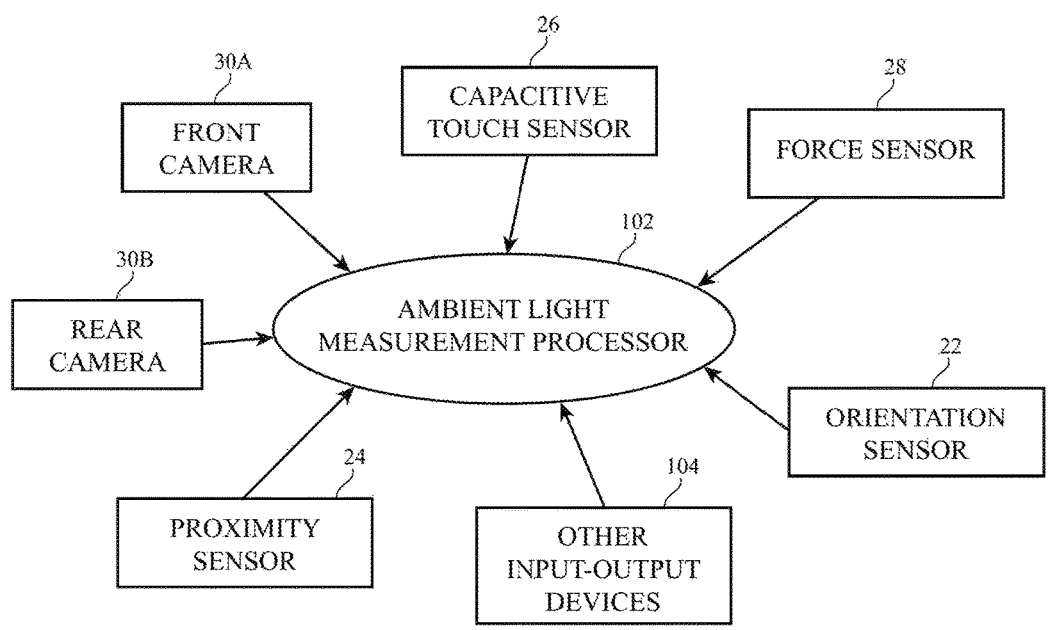
FIG. 8 is a diagram showing how information from sensors and other input-output devices may be used in processing ambient light sensor data in accordance with an embodiment.

FIG. 8 is a diagram showing illustrative data sources that may be used to provide sensor data and other data to an ambient light data processor routine implemented on control circuitry 16. As shown in FIG. 8, control circuitry (e.g., ambient light sensor measurement processor 102) may receive information from a front-facing image sensor such as front camera 30A, from a rear-facing image sensor such as rear camera 30B, from proximity sensor 24, from capacitive touch sensor 26, from force sensor 28 (e.g., a force sensor that measures force applied to all or some of display 14 or other portions of the exterior of device 10 and housing 32), from orientation sensor 22, and information from other input-output devices 104 and other circuitry in device 10 (e.g., information indicating that button 34 of FIG. 2 is being pressed and that a user's finger is therefore located on button 34, information on software running on device 10 that helps identify the current operating state of device 10, etc.).

Figure 9:
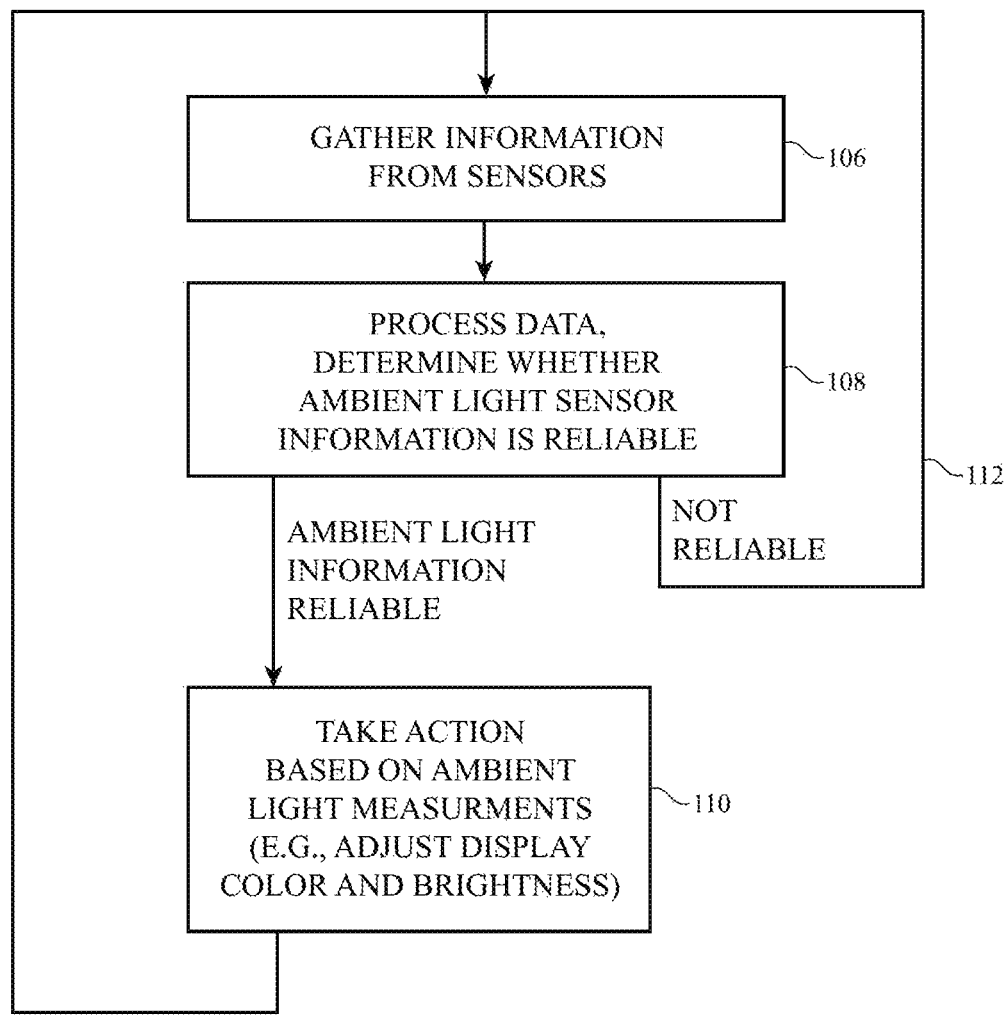
FIG. 9 is a flow chart of illustrative steps involved in using information from input-output devices such as sensors in processing ambient light sensor signals in accordance with an embodiment.

A flow chart of illustrative steps involved in operating device 10 while using information from sensors 18 and other information in device 10 of the type shown in FIG. 8 to determine how to process ambient light sensor information from sensors 20 is shown in FIG. 9.

At step 106, control circuitry 16 may gather information from sensors 18. The information may include measurements from ambient light sensors such as color ambient light sensors 20 and, if desired, additional sensors 18. For example, in an arrangement of the type shown in FIG. 2, color ambient light sensor information may be gathered from a first color ambient light sensor under window 36 on the upper left corner of housing 32 and from a second color ambient light sensor under window 36 on the upper right corner of housing 32. These measurements may include ambient light intensity data and ambient light color data. Processing operations such as comparisons of the readings of one of the color ambient light sensors to another and comparisons of the readings of each color ambient light sensor to predetermined threshold values may be performed to determine whether the ambient light data from one or both sensors 20 is reliable or is unreliable (see, e.g., the operations of FIGS. 6 and 7).

If the data analysis operations performed on the color ambient light sensor measurements (and, if desired, additional sensor measurements) of step 106 indicate that the ambient light information from sensor(s) 20 is reliable, operations may proceed to step 110, where suitable actions may be taken by control circuitry 16 based on the color ambient light sensor information. Examples of actions that may be taken by device 10 based on ambient light intensity and/or color information include adjusting display brightness (e.g., increasing brightness when measured ambient light intensity values are high and decreasing brightness when measured ambient light intensity values are low) and adjusting display color cast such as adjusting display 14 so that display 14 renders images with a colder (bluer) appearance when device 10 is in a high color temperature environment such as outdoors environments and renders images with a warmer (yellower) appearance when device 10 is in a low color temperature environment such as when device 10 is in an indoors environment with warm interior lighting. Other actions may be taken based on ambient light intensity and/or ambient light color, if desired. For example, control circuitry 16 can adjust the appearance of objects on display 14, can adjust the shading and texture of on-screen content, can change the operating mode of a book reading application or other software running on device 10, etc.

If the data analysis operations performed on the color ambient light sensor measurements (and, if desired, additional sensor measurements) of step 106 indicate that the ambient light sensor (ALS) information from sensor(s) 20 is unreliable, operations may loop back to step 106 as indicated by line 112, so that additional information may be gathered from sensors 20, sensors 18, and/or other sources of information on the operating environment and operating status of device 10. The additional sensor information that is gathered may include, for example, information from the data sources shown in FIG. 8 (e.g., one or more, two or more, or three or more, or four or more sources of data such as sensors 30A, 30B, 26, 28, 22, 24, and other input-output devices 104). The additional information that is gathered may include, for example, intensity and/or color information on ambient light that is measured using a front-facing camera behind window 38 (FIG. 2). The front-facing camera may not be blocked by a user's fingers even when both of sensors 20 are blocked by the user's fingers, so examination of data from sensor 30A may help reveal whether image sensors 20 are both blocked. The additional information that is gathered may also include information from capacitive touch sensor(s) 26 and/or proximity sensor(s) 24 that may reveal whether a user's finger or other external object is blocking either of sensors 20. Force sensor information from force sensor 28 may reveal where a user's fingers are located (i.e., where force is being applied to a portion of display 14, etc.), which may, in turn, reveal whether sensors 20 are being blocked by the user's fingers. Orientation sensor 22 may reveal operational status information such as whether device 10 is being used in a menu button up mode, a menu button to the side mode, or a menu button down mode. This orientation information may, in turn, reveal whether it is likely that user's fingers are blocking both of sensors 20 (which is most likely when device 10 is in a menu button up orientation). Information on the mode of operation of device 10 and/or other information on the status and operating environment may also be gathered from other input-output devices 104. After gathering additional information from sensors 18 and other sources in this way, control circuitry 16 may process the information from sensors 20, sensors 18, and/or other devices 104 at step 108 to help produce reliable ambient light data. The processing operations may involve comparisons of sensor readings and other data to current readings (e.g., comparisons of readings of one ambient light sensor 20 to another, comparisons of ambient light readings from ambient light sensor 20 to ambient light readings made using an image sensor 30, etc.) and/or may involve comparisons of sensor readings and other data to historical values. Historical sensor data and other information may be maintained in storage in control circuitry 16.

Reliable ambient light information that is produced during the processing operations of step 108 may be produced by selecting the ambient light readings from a given one of sensors 20, by calculating a mean value or otherwise processing information from both of sensors 20, by using ambient light information from an image sensor or other sensor 18 in lieu of ambient light information from sensors 20 or in combination with ambient light information from sensors 20, or by otherwise processing information from ambient light sensor(s) 20, sensors 18, and/or other devices 104 to produce reliable information on ambient light intensity and/or ambient light color. Following production of reliable ambient light information, control circuitry 16 may take suitable action at step 110 before looping back to step 106. If the processing operations of step 108 are unsuccessful at producing reliable ambient light information, operations may loop back to step 106 without taking actions at step 110 so that additional sensor measurements may be gathered.

The foregoing is merely illustrative and various modifications can be made by those skilled in the art without departing from the scope and spirit of the described embodiments. The foregoing embodiments may be implemented individually or in any combination.

What is claimed is:

1. An electronic device that is exposed to ambient light, comprising:
   a housing;
   control circuitry in the housing;
   first and second color ambient light sensors that receive the ambient light from outside the electronic device;
   an additional sensor; and
   a display, wherein the control circuitry adjusts the display based on information from the first and second color ambient light sensors and the additional sensor and wherein the control circuitry is configured to adjust a color cast of the display based on a comparison between ambient light color information from the first color ambient light sensor and ambient light color information from the second color ambient light sensor.

2. The electronic device defined in claim 1 wherein the additional sensor comprises an image sensor.

3. The electronic device defined in claim 2 wherein the housing has front and rear faces, wherein the display is mounted on the front face, and wherein the display has light-transmitting windows in an inactive portion of the display.

4. The electronic device defined in claim 3 wherein the light-transmitting windows include first and second light-transmitting windows through which ambient light passes respectively to the first and second ambient light sensors.

5. The electronic device defined in claim 4 wherein the light-transmitting windows include a third light transmitting window that is located between the first and second light-transmitting windows and wherein ambient light passes to the image sensor through the third light-transmitting window.

6. The electronic device defined in claim 1 wherein the additional sensor comprises a capacitive touch sensor having an electrode that monitors whether an object is blocking the first color ambient light sensor.

7. The electronic device defined in claim 1 wherein the additional sensor comprises a light-based proximity sensor adjacent to the first color ambient light sensor that monitors whether an object is blocking the first color ambient light sensor.

8. The electronic device defined in claim 1 wherein the additional sensor comprises a force sensor.

9. The electronic device defined in claim 1 wherein the additional sensor comprises an orientation sensor.

10. The electronic device defined in claim 1 wherein the control circuitry is configured to adjust the display by adjusting display brightness based on ambient light intensity information from the first and second color ambient light sensors.

11. The electronic device defined in claim 1 wherein the control circuitry is configured to adjust the color cast based on ambient light color information produced by computing a mean of an ambient light color measurement from the first color ambient light sensor and an ambient light color measurement from the second color ambient light sensor.

12. The electronic device defined in claim 1 wherein the control circuitry is configured to maintain a history of ambient light intensity and color measurements from the first and second color ambient light sensors and is configured to adjust the display based at least partly on the history.

13. The electronic device defined in claim 1 wherein the control circuitry is configured to maintain a history of ambient light intensity and color measurements from the first and second color ambient light sensors and is configured to discard ambient light sensor intensity and color information from at least a given one of the first and second color ambient light sensors when it is determined from a comparison between the ambient light sensor intensity and color information and the history of ambient light intensity and color measurements that the ambient light sensor intensity and color information from the given one of first and second color ambient light sensors is not to be trusted.

14. The electronic device defined in claim 1 wherein the control circuitry is configured to determine how much to adjust the display based at least partly on comparing ambient light sensor readings from the first color ambient light sensor to ambient light sensor readings from the second color ambient light sensor.

15. The electronic device defined in claim 1 wherein the control circuitry is configured to determine whether to discard data from the first and second color ambient light sensors by comparing data from the first and second color ambient light sensors to damaged sensor criteria.

16. A method of adjusting a display in an electronic device having first and second color ambient light sensors and having control circuitry, comprising:
    with the control circuitry, gathering ambient light measurements from the first and second color ambient light sensors based on received ambient light from outside the electronic device;
    with the control circuitry, processing the ambient light measurements from the first and second color ambient light sensors to produce ambient light color information, wherein processing the ambient light measurements from the first and second color ambient light sensors comprises comparing the ambient light measurements from the first color ambient light sensor to the ambient light measurements from the second color ambient light sensor; and
    with the control circuitry, adjusting a color cast of the display based on the ambient light color information.

17. The method defined in claim 16 wherein the electronic device further comprises an image sensor and wherein processing the ambient light measurements comprises processing both the ambient light measurements from the first and second color ambient light sensors and measurements from the image sensor to produce the ambient light color information.

18. The method defined in claim 16 wherein the electronic device further comprises a touch sensor and wherein processing the ambient light measurements comprises using ambient light measurements from the second color ambient light sensor and not from the first color ambient light sensor in response to detecting with the touch sensor that the first color ambient light sensor is blocked.

19. The method defined in claim 16 wherein electronic device further comprises an orientation sensor and wherein processing the ambient light measurements from the first and second color ambient light sensors comprises using orientation information from the orientation sensor to determine whether the first and second color ambient light sensors have been blocked by external objects.

20. An electronic device, comprising:
    a housing;
    a display mounted in the housing;
    first and second color ambient light sensors that make ambient light intensity measurements and ambient light color measurements based on ambient light received from outside the electronic device;
    an additional sensor that produces additional sensor data; and
    control circuitry that is configured to adjust display intensity and display color cast for the display based on ambient light information produced by processing the ambient light intensity measurements, the ambient light color measurements, and the additional sensor data, wherein the ambient light information is produced at least in part by comparing the ambient light color measurements between the first and second color ambient light sensors, wherein the display has an active area that displays images and an inactive area that borders the active area, wherein the color ambient light sensor is mounted under a first window in the inactive area, wherein the additional sensor is mounted under a second window in the inactive area, and wherein the additional sensor comprises a sensor selected from the group consisting of: a camera, a touch sensor that monitors whether the color ambient light sensor is blocked, an orientation sensor, a force sensor, and a light-based proximity sensor.

* * * * *